No. 813,472. PATENTED FEB. 27, 1906.
E. J. WILLIS.
ELECTRIC MACHINE.
APPLICATION FILED FEB. 8, 1905.
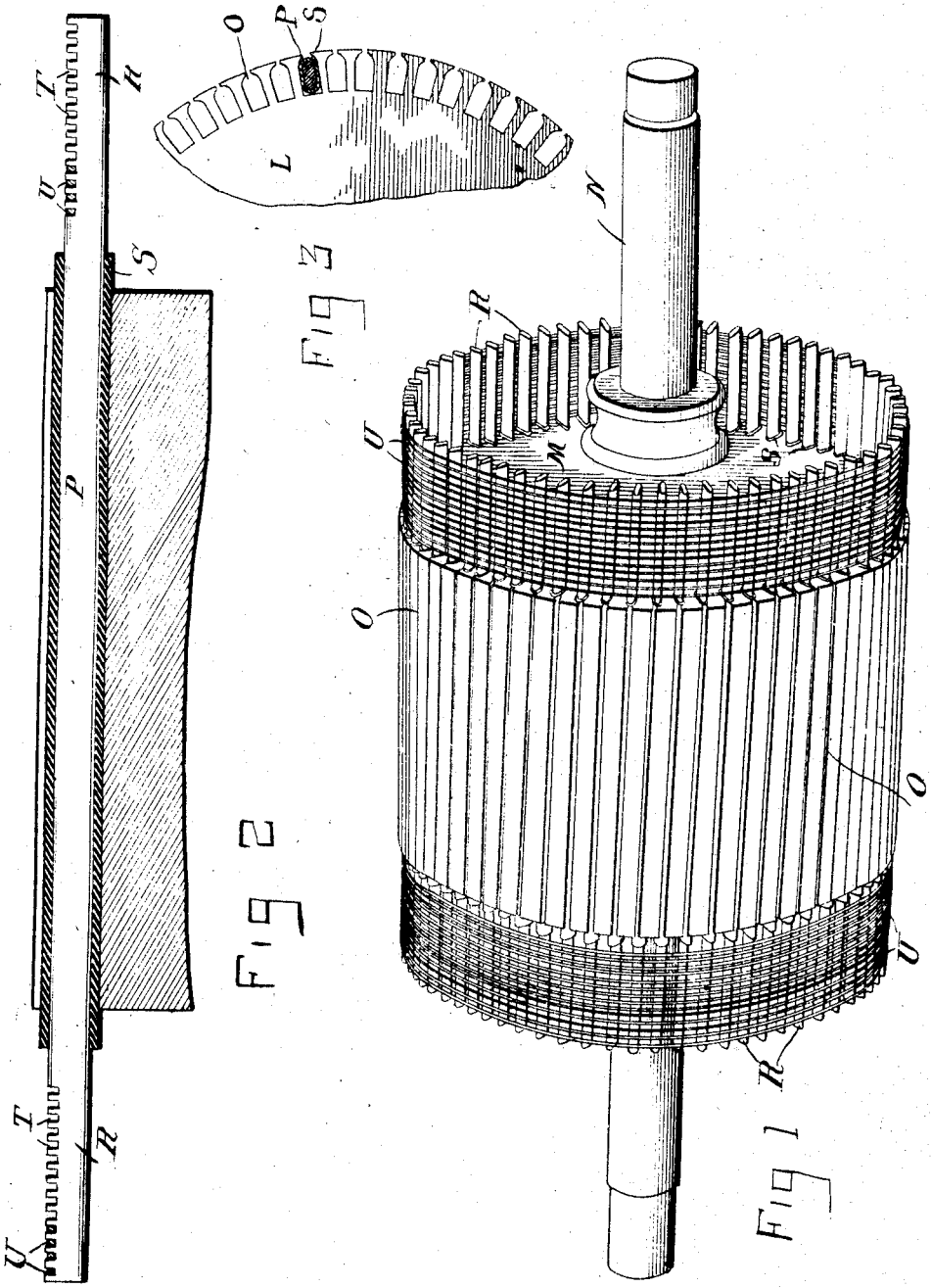

UNITED STATES PATENT OFFICE.

EDWARD J. WILLIS, OF RICHMOND, VIRGINIA.

ELECTRIC MACHINE.

No. 813,472.	Specification of Letters Patent.	Patented Feb. 27, 1906.

Application filed February 8, 1905. Serial No. 244,772.

*To all whom it may concern:*

Be it known that I, EDWARD J. WILLIS, a citizen of the United States, residing at Richmond, in the county of Henrico and State of Virginia, have invented certain new and useful Improvements in Electric Machines, of which the following is a specification.

This invention relates to improvements in electric machines, especially polyphase induction-machines, and has for its particular object to provide an improved rotor of the squirrel-cage type in which the bars are bonded by a plurality of wires wound about the extended ends of the cage-bars and each secured to and electrically connected with each end of said bars.

With this and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of my improved rotor, showing the manner of bonding the extended ends of the rods forming the "cage." Fig. 2 is a vertical sectional view of a fragment of the rotor, taken on a radial line. Fig. 3 is a fragmentary view of one of the plates forming the laminated body of the rotor and showing the form of the slots and a rod and its insulation shown in transverse section within one of the slots.

In the preferred embodiment of my invention the rotor-body M is composed of the usual laminæ, punched, as illustrated in Fig. 3, and mounted upon shaft N to form longitudinal slots O of the form shown. Within each of the slots is mounted a copper rod P, with the ends R thereof extended beyond the laminated body M and insulated therefrom by suitable insulating materials S. The extended ends R of the rods P are provided with a plurality of notches T, arranged in circumferential alinement entirely around the cage formed by the extended ends, and in the said notches are arranged a plurality of naked wires U, preferably arranged spirally, so that the several windings may be composed of a single wire or they may be composed of a plurality of individual wires. At each of the several places where the several wires are disposed within the notches the electrical connection is made more perfect by soldering.

It has been found that the plurality of wires used to bond the ends of the rods of a squirrel-cage rotor offers great resistance to the passage of the induced currents, while from its very open form such an arrangement offers great facility for cooling.

While I have shown and described the preferred form of a rotor embodying my invention, it is obvious that numerous changes in the form and proportion may be made without departing from the spirit of the invention or the scope of the appended claims.

Having thus described my invention, what I claim as novel, and desire to secure by Letters Patent, is—

1. An element for induction electric machines, provided with a plurality of rods extending longitudinally beyond the ends of the element and a plurality of bonds consisting of naked wires spaced apart and extending entirely around said element upon said extended ends and each bond electrically connected with each rod at each contact-point.

2. An element for induction electric machines provided with a plurality of rods extending longitudinally beyond the ends of the body of the element and a bond extending continuously and spirally a plurality of times entirely around said extended ends and each coil of the spiral electrically connected with each of said extended ends adjacent to but separated from the preceding coil.

3. An element for induction electric machines provided with a plurality of slots formed parallel with the rotor-axis, an insulated rod disposed within each of said slots and extending beyond each end of the body and a bond extending continuously and spirally a plurality of times entirely around the element and each coil of the spiral electrically connected with each of the extended ends adjacent to but not touching the preceding coil.

4. An element for induction electric machines comprising a laminated body provided with a plurality of slots formed parallel with the rotor-axis, a rod disposed within each of the said slots and insulated from and extending beyond each end of the said laminated body each of said extended ends being provided with a plurality of transverse notches disposed in circumferential alinement entirely around the cage formed by said extended ends and a plurality of bonds equal in number to the number of notches in each end of each rod and extending entirely around said element and each disposed within and electrically connected at each notch of each alined series.

5. An element for induction electric machines comprising a laminated body provided with a plurality of slots formed parallel with the rotor-axis, a rod disposed within each of said slots insulated from and extending beyond each end of the said laminated body each of said extended ends being provided with a plurality of transverse notches disposed in circumferential alinement entirely around the cage formed by said extended ends, bonds at each end wound spirally about said cage and disposed within said notches and means securing said bonds within said notches and in electrical connection with said rods.

In testimony whereof I affix my signature in presence of two witnesses.

EDWARD J. WILLIS.

Witnesses:
T. H. PERRY,
MARY JONES.